United States Patent
Madhipatla et al.

(10) Patent No.: US 10,489,808 B1
(45) Date of Patent: Nov. 26, 2019

(54) POLICIES BASED ON COMBINATIONS OF ATOMIC CONSTRAINTS

(71) Applicant: VCE Company, LLC, Richardson, TX (US)

(72) Inventors: Venkatesh S. Madhipatla, Westford, MA (US); Praphul Krottapalli, Richardson, TX (US); Sanjay Basu, Richardson, TX (US)

(73) Assignee: VCE IP Holding Company LLC, Richardson, TX (US)

( * ) Notice: Subject to any disclaimer, the term of this patent is extended or adjusted under 35 U.S.C. 154(b) by 963 days.

(21) Appl. No.: 14/548,230

(22) Filed: Nov. 19, 2014

(51) Int. Cl.
*G06Q 30/02* (2012.01)
*H04L 12/911* (2013.01)

(52) U.S. Cl.
CPC ....... *G06Q 30/0206* (2013.01); *H04L 47/822* (2013.01)

(58) Field of Classification Search
CPC .......................... G06Q 30/0206; H04L 47/822
See application file for complete search history.

(56) References Cited

U.S. PATENT DOCUMENTS

| | | | | |
|---|---|---|---|---|
| 9,055,067 | B1* | 6/2015 | Ward, Jr. | H04L 67/10 |
| 2012/0110462 | A1* | 5/2012 | Eswaran | G06F 9/5072 |
| | | | | 715/736 |
| 2013/0339949 | A1* | 12/2013 | Spiers | G06F 9/45558 |
| | | | | 718/1 |
| 2014/0207918 | A1* | 7/2014 | Kowalski | H04L 41/0803 |
| | | | | 709/220 |
| 2014/0280848 | A1* | 9/2014 | Modh | G06Q 30/0631 |
| | | | | 709/223 |
| 2016/0057027 | A1* | 2/2016 | Hinrichs | G06F 15/173 |
| | | | | 709/224 |

* cited by examiner

*Primary Examiner* — Michael A Keller
(74) *Attorney, Agent, or Firm* — Womble Bond Dickinson (US) LLP (57) ABSTRACT

A method for determining policies for cloud orchestrators is provided. The method includes sending from a server to a client device, availability and pricing information pertaining to a plurality of constraints relating to a plurality of resources as managed by a plurality of cloud orchestrators, for selection. The method includes receiving at the server, via the network, the selection from the client device and generating, at the server, a policy for at least one of the plurality of cloud orchestrators, based on the selection.

17 Claims, 6 Drawing Sheets

| Data Structure | | |
|---|---|---|
| Cloud Orchestrator | Resource Type | Constraints Supported /Pricing |
| A | Storage | Cost/GB, Tier 1,2,3 Mirroring, Raid |
| | Network | Cost/Throughput Data Rates, Priority |
| | Security | Communication Storage |
| | Processing | Cost/Virtual Machine Operating System |
| B | ⋮ | ⋮ |
| C | | |
| D ⋮ | | |

| Resource | | Availability/Cost/Orchestrator | | | | |
|---|---|---|---|---|---|---|
| | | A | B | C | D | ... |
| Storage | ☐ GB<br>☐ Tier<br>☐ Mirroring<br>☐ Raid | | | | | |
| Network | ☐ Throughput<br>☐ Priority | | | | | |
| Security | ☐ Communication<br>☐ Storage | | | | | |
| Processing | ☐ Virtual Machine(s)<br>☐ Operating System | | | | | |
| | Total Cost | | | | | |
| Generate Policy ☐ | | | | | | |

POLICIES BASED ON COMBINATIONS OF ATOMIC CONSTRAINTS

BACKGROUND

When an enterprise seeks information technology (IT) resources, there may be a preferred vendor, or a range of vendors to consider. Often, the enterprise has security, tenant, compliance and performance requirements, etc. The process of figuring out what is available, and what the trade-offs are, is time-consuming. Nowadays, there are vendors that can configure virtual machines based on user requests. However, the enterprise may have to accept that a vendor can meet some of the enterprise requirements and not others, and the resultant configuration is somewhat of a compromise. A standard combination of options from a vendor offers limited flexibility to define a policy. Also, pricing information for the various trade-offs may be difficult to determine.

SUMMARY

Embodiments of a method device and a system are provided. In some embodiments, a method for determining policies for cloud orchestrators is provided. The method includes sending from a server to a client device, availability and pricing information pertaining to a plurality of constraints relating to a plurality of resources as managed by a plurality of cloud orchestrators, for selection. The method includes receiving at the server, via the network, the selection from the client device and generating, at the server, a policy for at least one of the plurality of cloud orchestrators, based on the selection.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A policy generator and a pricing module, which can be embodied as modules in a server, provide information to users about pricing and availability of resources and constraints in a cloud computing environment. A user can obtain real-time information about the pricing and availability, assemble various selections, and receive a price quote before making a decision about computing resources from vendors. Once the user makes a decision, the policy generator produces a policy specific to a cloud orchestrator, or specific to each of multiple cloud orchestrators. The cloud orchestrator(s) can then configure virtual machines in accordance with the policy. The policy generator and the pricing module automate various processes, and present information to the user in a manner that saves time, reduces errors and helps the user optimize the resultant newly set up system.

Figure 1:
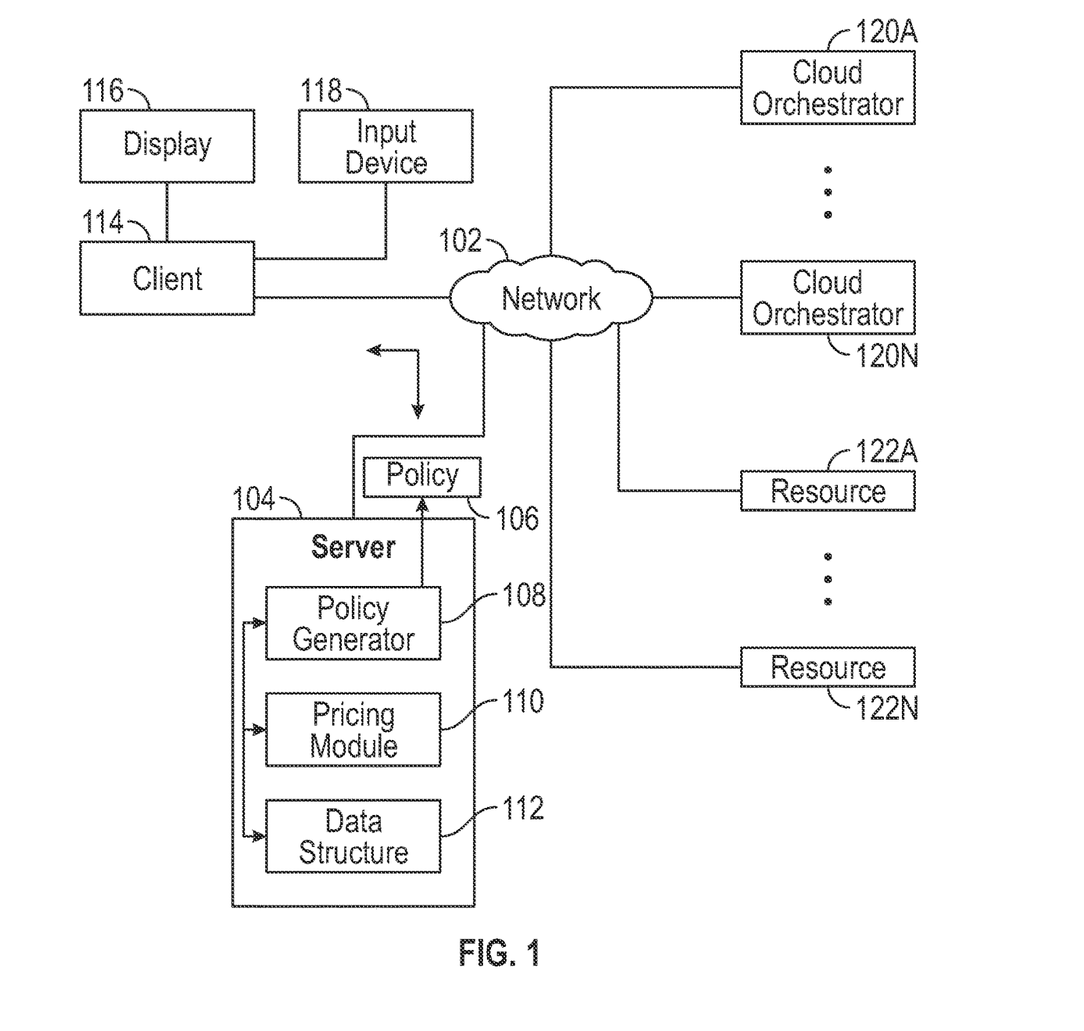
FIG. 1 is a system diagram depicting interactions among a client device, cloud orchestrators, resources, and a server having a policy generator and a pricing module, in accordance with some embodiments.

FIG. 1 is a system diagram depicting interactions among a client device 114, cloud orchestrators 120, resources 122, and a server 104 having a policy generator 108 and a pricing module 110, in accordance with an embodiment of the present disclosure. These devices are coupled to a network 102, such as the global communication network known as the Internet, and the devices communicate with one another. In the embodiment shown data structure 112 can be used by the policy generator 108 and the pricing module 110. In variations, portions of the data structure 112 could be included in the policy generator 108 and/or the pricing module 110. The client device 114 has a display 116 and an input device 118 (e.g., keyboard, mouse, etc.). The resources 122 may be available from a variety of vendors or providers. In preparation for communicating with a client device 114, the server 104 consolidates information into the data structure 112. These actions can be performed by the policy generator 108 and/or the pricing module 110 in some embodiments. The information that is gathered into the data structure 112 includes pricing information and availability information about the resources 122, various constraints, and the cloud orchestrators 120.

Cloud orchestrators are machines, typically servers with associated software that configure or manage various resources 122, to form virtual machines, as will be further described with reference to FIG. 2. Examples of cloud orchestrators include Cisco UCS (Unified Computing System) Director, VMware Vcloud Automation Center (VCAC), VMware VCenter Server, and VMware vCloud Air (formerly vCloud Hybrid Service (VCHS)). Individual resources 122A can be owned and operated by the same entity as one of the cloud orchestrators 120A, or resources 122A can be cloud resources owned and operated by another entity or entities. Cloud orchestrators 120 may offer differing mixes of resources 122 and support differing constraints relative to those resources 122. The policy generator 108, the pricing module 110, and/or some other aspect of the server 104 communicates with each of the cloud orchestrators 120A, 120N. The policy generator 108 and the pricing module 110 gather information about which resources 122A, 122N are supported by which cloud orchestrators 120A, 120N, and which constraints relative to the resources 122A, 122N are supported by which cloud orchestrators 120A, 120N. Alternatively, this information is manually entered, e.g., by a data technician. This information is placed into the data structure 112 and stored within the server, as will be discussed in more detail with reference to FIG. 3. Pricing for the constraints can be maintained within the scope of the application. For example, pricing can be assigned for the enumerated list of constraints associated with the various domains, e.g., compute, network, storage, virtualization, security, etc. Similarly, the constraints can be acquired and maintained within the scope of the application and the policy generator 108. The constraints are thus atomic constraints, associated to pricing.

Continuing with FIG. 1, the policy generator 108 communicates information about pricing and availability of resources 122 and constraints to the client device 114. This communication is based on the contents of the data structure 112, and could have a format such as described below with reference to FIG. 4. The client device 114 presents the information on the display 116. A user can then make various selections with full knowledge of what resources and constraints are available from each of the cloud orchestrators 120A, 120N, and what the costs are for various possibilities. In this manner, the user receives pricing information dynamically based on the atomic constraints selected, from the server 104. The user, upon deciding, can request or otherwise give permission to proceed with policy generation. The policy generator 108 then derives, generates or otherwise produces a policy 106 in accordance with the user selection. In various embodiments, the policy 106 is specific to a specific cloud orchestrator 120A, or the policy 106 includes a plurality of policies, each of which is specific to a particular one of the cloud orchestrators 120A, 120N. Accordingly, the plurality of policies could include multiple policies all of which are specific to a cloud orchestrator 120A. Alternatively, the plurality of policies could include one or more policies specific to one of the cloud orchestrators 120A, and a further one or more policies specific to another one of the cloud orchestrators 120N, and so on. The policy 106 is sent out via the network 102, to one or more of the cloud orchestrators 120.

Figure 2:
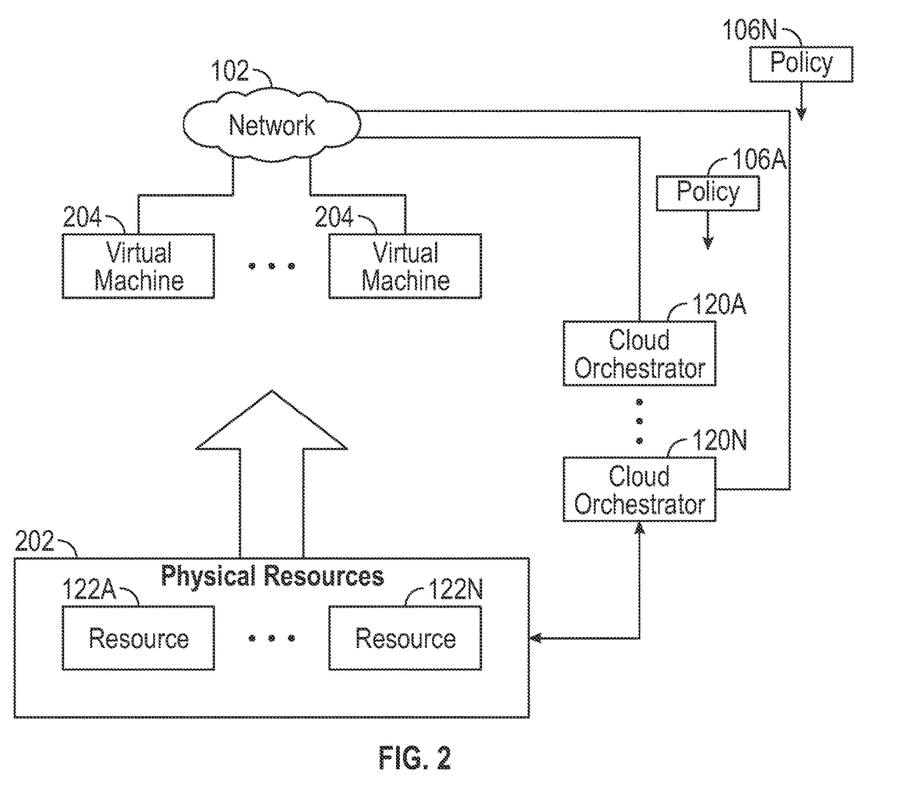
FIG. 2 is a system diagram depicting cloud orchestrators receiving a policy from the policy generator of FIG. 1, and implementing virtual machines from physical resources in accordance with some embodiments.

FIG. 2 is a system diagram depicting cloud orchestrators 120A, 120N receiving a policy 106A, 106N from the policy generator 108 of FIG. 1, and implementing virtual machines 204 from physical resources 202. The physical resources 202 may include the resources 122A through 122N of FIG. 1, which could include storage, network and processing resources, among others. The cloud orchestrators 120A, 120N allocate, coordinate and/or provision the physical resources 202 as virtual machines 204, in accordance with the policies 106A, 106N specific to each cloud orchestrator 120A, 120N. Once commissioned or initiated, the virtual machines 204 can couple to the network 102 and perform services and tasks in accordance with the policies 106A, 106N.

Figure 3:
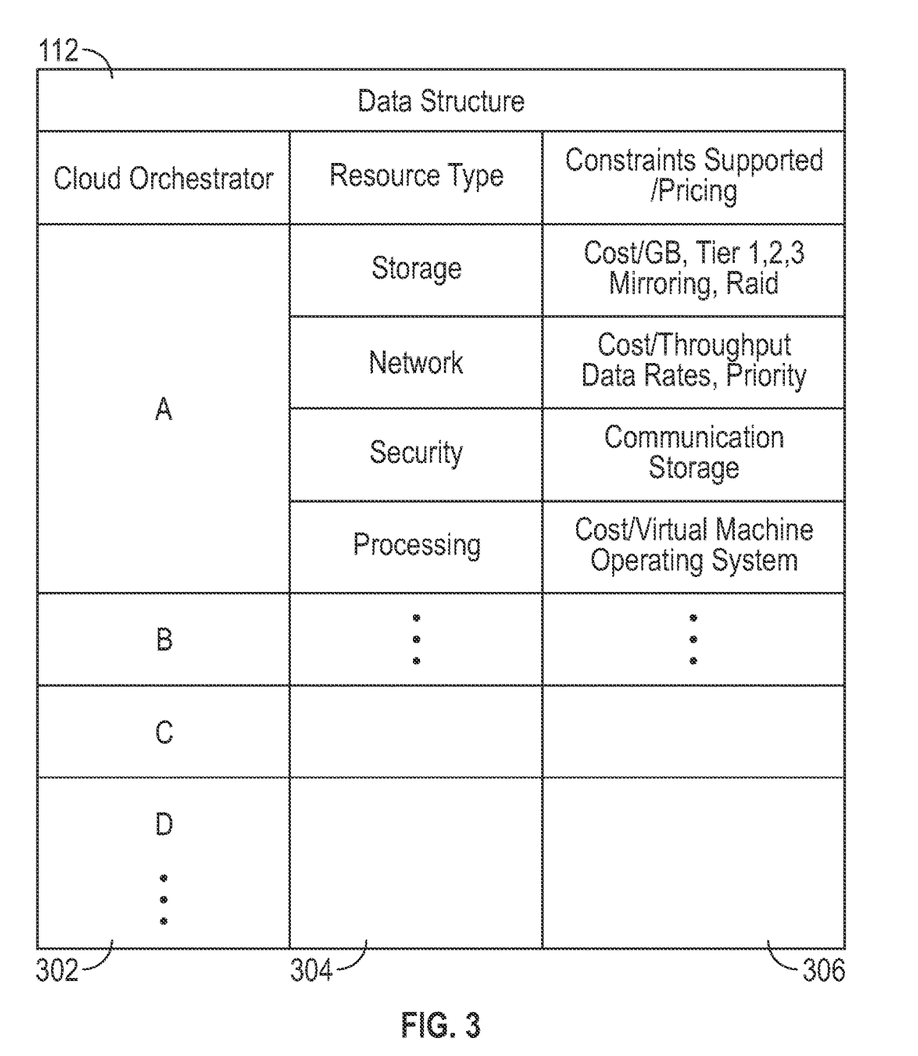
FIG. 3 depicts an embodiment of a data structure that can be used by the policy generator and the pricing module of FIG. 1 in accordance with some embodiments.

FIG. 3 depicts an embodiment of a data structure 112 that can be used by the policy generator 108 and the pricing module 110 of FIG. 1. It should be appreciated that further data structures and formats to organize information within a data structure are readily devised in accordance with the teachings herein. The data structure 112 has fields 302, 304, 306 for entering, associating, and accessing the various pieces of information used by the policy generator 108 and the pricing module 110. Names, identifiers, IP (Internet protocol) addresses and other information about cloud orchestrators 120 are entered in the cloud orchestrator field 302. Names, identifiers, resource types, IP addresses and other information about resources 122 are entered in the resource type field of 304. Constraints, pricing, and indication of which constraint(s) are supported for each resource by a specific cloud orchestrator are entered in the constraints supported and pricing field 306. This information could be broken out into subfields. For example, an entry could indicate that storage tiers 1, 2, and 3 are supported by cloud orchestrator 120 "A" (e.g., 120A of FIG. 1) at a specified cost per gigabyte for each tier. In some embodiments, an entry could indicate that one of the cloud orchestrators 120A does not support mirroring, and another one of the cloud orchestrators 120 "B" does support mirroring, but only for tier 1 storage, etc. Other entries could indicate pricing and whether a specified cloud orchestrator 120 offers network resources, and what the cost for various throughput data rates are or what the cost is to support various network traffic priorities. Further entries could indicate whether security is supported, and whether this is supported for communication resources or storage resources, and what the prices are, and whether processing resources are offered by that cloud orchestrator 120. Cost per virtual machine or for aspects of virtual machines could be specified, and which operating systems are offered and their cost could also be specified. In one embodiment, flexible pricing is based on the day or time of the day. For example, a virtual machine could use platinum grade resources (e.g., tier 1 storage, etc.) only during the daytime, and could be automatically migrated to lesser tiered resources during nights and weekends. This can be incorporated as a constraint in the policy. With the constraints, the policy and the pricing, the user can specify in the policy how the resources should be managed or provided, for a flexible pricing. Further constraints, pricing and resource types are readily supported in the data structure 112, as FIG. 3 is one example of a data structure and not meant to be limiting.

The data structure 112 of FIG. 3 could be populated in various ways. As mentioned above with reference to FIGS. 1 and 2, the policy generator 108 surveys the cloud orchestrators 120A, 120N and determines which cloud orchestrator 120 supports which resource 122A, 122N and which constraint(s). The information may be manually entered into the data structure 112. In some embodiments this information is sent from cloud orchestrators 120 to the server 104, via the network 102. The pricing module 110 determines pricing information by similarly surveying the cloud orchestrators 120. Pricing information may also be manually entered. Various further embodiments are readily devised, including combinations of the above. In some embodiments, resources 122 are identified on the basis of a domain. That is, domains are established and resources 122 relating to each of the domains are identified. For example, there could be a storage domain, a network domain, a compute domain and a platform domain, among others. A security domain could be established, or aspects of security could be relegated to the other domains. Constraints may also be identified on the basis of the domains. For example, the storage domain could have a mirror constraint, a size constraint, a thick or thin provisioning constraint, a tenant requirements constraint, and a tier constraint. The network domain could have a VLAN (virtual local area network) constraint, a gateway enable or disable constraint, and a subnet constraint. The compute domain could have a CPU (central processing unit) constraint and a memory constraint. Once a domain is identified, the specific and available resources and constraints of the domain can be identified. These can be associated to the cloud orchestrators, according to what each cloud orchestrator supports. That is, individual atomic constraints can be associated with each of the domains as applicable. Key or value tables could be associated with constraints, and provide attribute information that may be required to fill in a constraint. For example, a disk size constraint could refer to a table to find actual attributes to be specified as part of that constraint. A domain model may include an execution order within the list of domains. For example, it may be preferable within a domain to allocate resources or establish constraints in a particular order, and it may be preferable to allocate resources and constraints to domains in a particular sequence of domains. Some or all of the above information can be placed in the data structure 112 or variations thereof.

Figure 4:
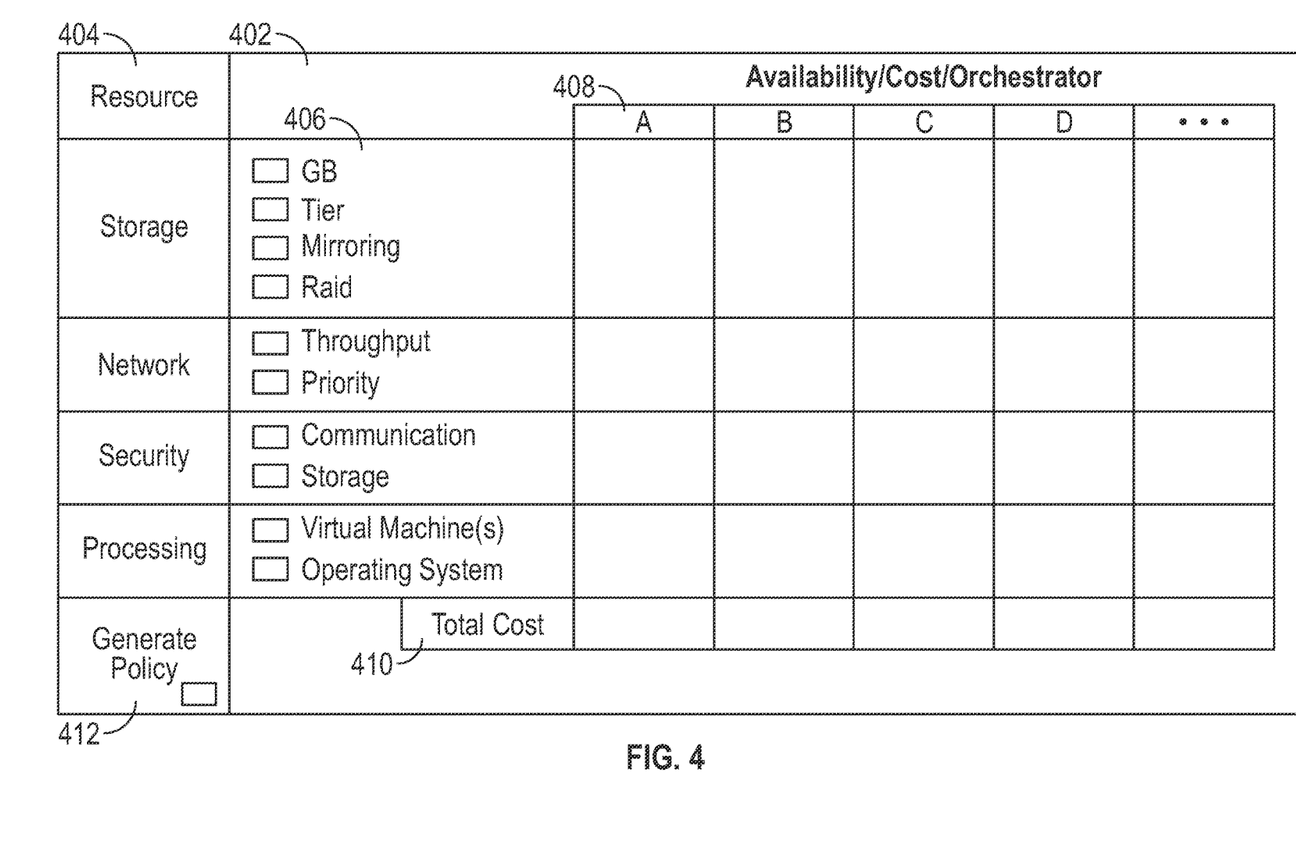
FIG. 4 depicts an embodiment of a graphical user interface that can be used by the policy generator and the pricing module of FIG. 1 in accordance with some embodiments.

FIG. 4 depicts an embodiment of a graphical user interface 402 that can be used by the policy generator 108 and the pricing module 110 of FIG. 1. This graphical user interface 402 could be formatted using hypertext markup language (HTML), as an example, and sent from the server 104 to the client device 114 via the network 102. The client device 114 shows the graphical user interface 402 on the display 116, and interacts with the graphical user interface 402 via the input device 118. The graphical user interface 402 has a resource field 404, a constraints field 406, and an availability and pricing field 408, and could have other fields as well. The resource field 404 shows the various resources, such as storage, network, security and processing. This is organized by domain, in some embodiments. The constraints field 406 shows constraints associated with the resources, and in the embodiment shown has a user entry section next to each constraint. For example, the constraints field 406 associated with the storage resources could show and allow entry for the number of gigabytes of storage, the tier number for the storage, a selection of whether or not mirroring is requested, and a selection for what type of redundant array of independent disks (RAID), if any, is requested. The constraints field 406 could have entries for selection of throughput or priority for network resources, communication or storage to which security resources are to be applied, virtual machines and operating system for processing resources, and so on. The availability and pricing field 408 shows whether a constraint for a resource 122 is available from a cloud orchestrator 120, and if so, what the cost (i.e., price) is for that constraint to that resource from that cloud orchestrator 120. A total cost field 410 presents the total cost as a summation for each cloud orchestrator 120, and a total cost across all of the cloud orchestrators 120. In some embodiments, the availability and pricing field 408 is relatively static, and is updated when a vendor changes availability of a resource or a constraint. In some embodiments, the availability and pricing field 408 is dynamic, and changes as combinations of constraints or resources are selected from among the cloud orchestrators, i.e., in response to selection of particular combinations or "package deals". The total cost field 410 may be dynamic to updates as selections are made. In some embodiments, the total cost field 410 could update in response to a user request, e.g., the user clicks on a button labeled "total" or "price quote", etc.

Referring to FIGS. 1 and 4, a user is presented on the display 116 attached to the client device 114, which resources 122 are available from which cloud orchestrator 120, and which constraints are supported by which cloud orchestrator 120. The user can see what each resource 122 and each constraint costs, and what a combination of resources 122 and constraints costs, on a per cloud orchestrator basis, and on a total package basis. The user has a real-time view of costs associated with policy constraints available from multiple vendors or providers via multiple cloud orchestrators 120. The server 104 acts as a portal that presents, in the graphical user interface 402, this real-time view to the user as a range of choices communicated by the policy generator 108 and the pricing module 110. When the user is satisfied with a selection of resource(s) 122, constraint(s) and cloud orchestrator(s) 120, and associated pricing, the user can proceed by clicking on or making an affirmative entry (e.g., by entering the letter "Y" for yes, clicking "yes", "accept", "confirm", "complete order", "next" or other affirmative phrase on a drop-down menu or in a selection area or otherwise confirming) to the generate policy field 412 in the graphical user interface 402. The generate policy field 412 could have text asking the user to confirm the selection, complete an order, proceed to configure virtual machines, or otherwise indicate to generate the policy 106. Affirming in the generate policy field 412 directs the policy generator 108 to proceed with policy generation in accordance with the user selection.

With reference to FIGS. 1, 3 and 4, the embodiments may have a parametric mechanism for generating the policy 106. Each cloud orchestrator 120 may have one or more specified formats for one or more policies specific to the cloud orchestrator 120. In some embodiments, templates for each of the specified formats are provided. The policy generator 108, employing the graphical user interface 402 and responses from the client 114, acts as a policy editor that creates a policy general to the server 104. When instructed to proceed with generation of a policy, the policy generator 108 extracts parameters from the user entries to the graphical user interface 402, pertaining to the user selection of resources 122, constraints, and cloud orchestrator(s) 120. The policy generator 108 then inserts the parameter values, or makes appropriate translation of the parameter values and inserts the translated values, into the appropriate location(s) in the appropriate template(s). The policy generator 108 translates from the selection (by the user, in the graphical user interface 402), as a policy general to the server 104, to a policy specific to one of the cloud orchestrators 120.

For example, a policy generated for orchestrator A (i.e., orchestrator 120A of FIG. 1) per the data structure 112 depicted in FIG. 3 and the graphical user interface 402 depicted in FIG. 4 could establish that the storage is 500 GB of tier 1 storage with mirroring. A policy generated for orchestrator B could establish that there is a network with medium throughput and the network is able to handle up to 10% high-priority traffic, with a surcharge for additional high-priority traffic. A policy generated for orchestrator C could establish that the storage security is to have the highest level, and communication is to have medium level security. A policy generator for orchestrator D could establish three virtual machines with the Linux operating system. In some embodiments, these example policies could be generated based on entries to the graphical user interface 402, in response to clicking in the generate policy field 412.

Figure 5:
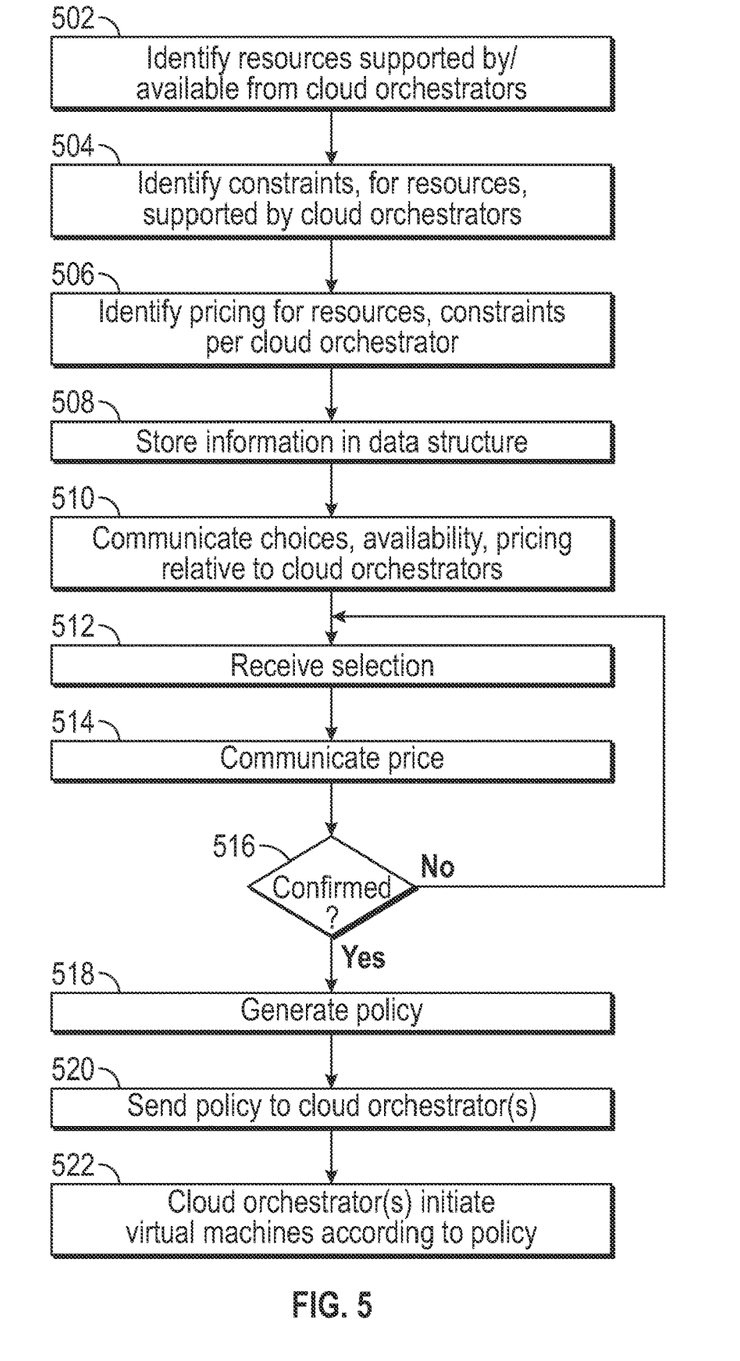
FIG. 5 is a flow diagram of a method for determining a policy, which can be practiced on or by the policy generator and the pricing module of FIG. 1 in accordance with some embodiments.

FIG. 5 is a flow diagram of a method for determining a policy, which can be practiced on or by the policy generator and the pricing module of FIG. 1 in some embodiments. The method can be practiced by a processor, for example a processor in a server that has a policy generator and a pricing module. Resources that are supported by and available from cloud orchestrators are identified in an action 502. For example, a server could survey cloud orchestrators and determine, for each cloud orchestrator, which resources are supported. This information could be sent from another source or manually entered in some embodiments. Constraints for the resources, as supported by the cloud orchestrators, are identified in an action 504. For example, the server could survey cloud orchestrators and determine, for each cloud orchestrator, and for each resource supported by the cloud orchestrator, which constraints for that resource are supported by the cloud orchestrator. This information could also be sent from another source, or manually entered.

Pricing for the resources and constraints is identified on a per cloud orchestrator basis, in an action 506 of FIG. 5. The information from identifying the resources and the constraints, as supported by the cloud orchestrators, and the pricing, is stored in a data structure, in an action 508. An example of contents and format of one suitable data structure is illustrated in FIG. 3. The data structure associates resources, constraints, availability and pricing on a per orchestrator basis. Choices, availability and pricing, relative to cloud orchestrators, are communicated in an action 510. For example, information about resources and constraints, availability of the resources and constraints at each cloud orchestrator, and pricing for resources and constraints at each cloud orchestrator, can be displayed in the graphical user interface depicted in FIG. 4. The graphical user interface can be sent from a server to a user device via a network, and shown on a display coupled to the user device, as depicted in FIG. 1.

The server receives a selection, from the user device, in an action 512. For example, the user could click on various selection boxes or otherwise select from among the choices offered in the graphical user interface. The user selection would then trigger the transmission of this information from the user device to the server, via the network. A price is communicated, in an action 514. For example, the pricing module can cooperate with the policy generator to send a price back to the user device for display to the user. The price could be communicated via the total cost field in the graphical user interface depicted in FIG. 4 in some embodiments. In a decision action 516, it is determined whether the selection is confirmed. If the selection is confirmed, flow continues to the action 518, to generate a policy. If the selection is not confirmed, flow branches back to the action 512 and repeats as discussed above. Various selection mechanisms are discussed above with reference to FIG. 4, and these or other types of selection could be applied to this decision action 516. In action 518, the policy is generated. Examples of policies are described above with reference to FIGS. 3 and 4. The policy could include further policies, each of which is specific to one of the cloud orchestrators.

The policy is sent to one or more cloud orchestrator, in an action 520. For example, the server could send the policy via the network, as depicted in FIGS. 1 and 2. The cloud orchestrator initiates one or more virtual machines, according to the policy, in an action 522. Multiple cloud orchestrators could initiate one or more virtual machines according to policies specific to each of the cloud orchestrators. Virtual machine initiation from resources directed by cloud orchestrators is depicted in FIG. 2. The virtual machines can couple to the network and perform services and tasks in accordance with the policies.

Figure 6:
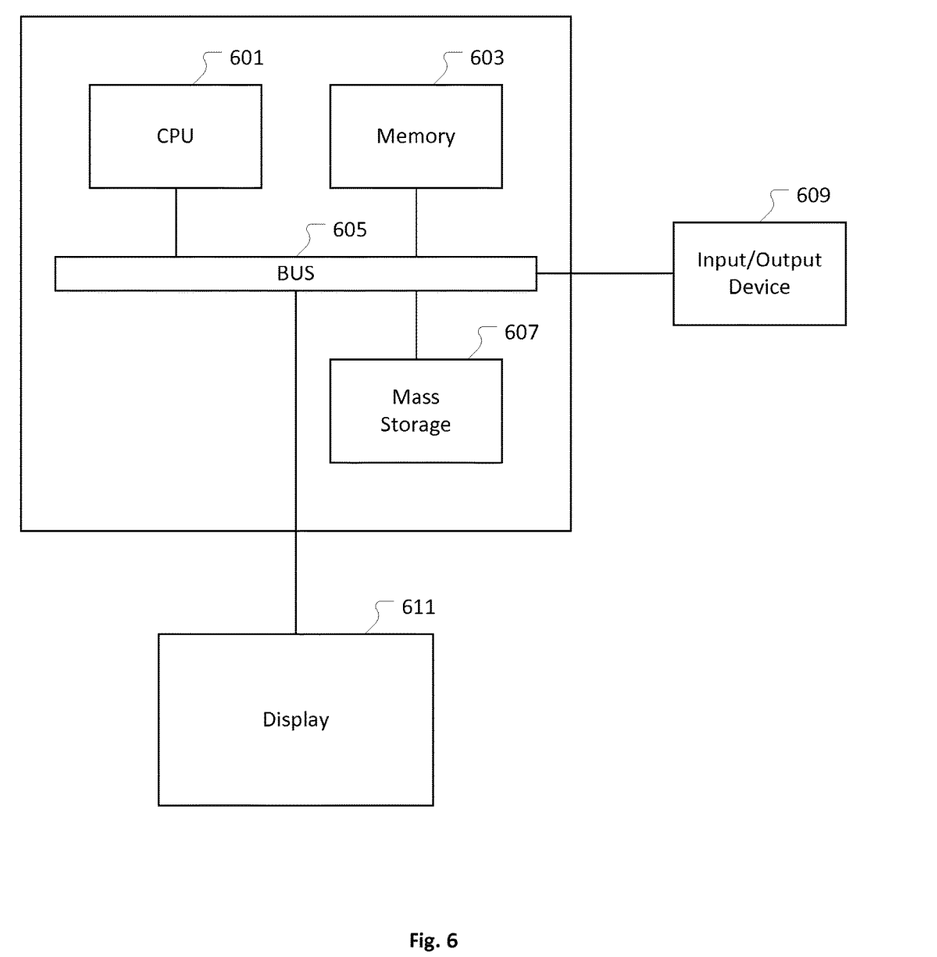
FIG. 6 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 6 is an illustration showing an exemplary computing device which may implement the embodiments described herein. The computing device of FIG. 6 may be used to perform embodiments of the functionality for policy generation in accordance with some embodiments. The computing device includes a central processing unit (CPU) 601, which is coupled through a bus 605 to a memory 603, and mass storage device 607. Mass storage device 607 represents a persistent data storage device such as a floppy disc drive or a fixed disc drive, which may be local or remote in some embodiments. The mass storage device 607 could implement a backup storage, in some embodiments. Memory 603 may include read only memory, random access memory, etc. Applications resident on the computing device may be stored on or accessed via a computer readable medium such as memory 603 or mass storage device 607 in some embodiments. Applications may also be in the form of modulated electronic signals modulated accessed via a network modem or other network interface of the computing device. It should be appreciated that CPU 601 may be embodied in a general-purpose processor, a special purpose processor, or a specially programmed logic device in some embodiments.

Display 611 is in communication with CPU 601, memory 603, and mass storage device 607, through bus 605. Display 611 is configured to display any visualization tools or reports associated with the system described herein. Input/output device 609 is coupled to bus 605 in order to communicate information in command selections to CPU 601. It should be appreciated that data to and from external devices may be communicated through the input/output device 609. CPU 601 can be defined to execute the functionality described herein to enable the functionality described with reference to FIGS. 1-5. The code embodying this functionality may be stored within memory 603 or mass storage device 607 for execution by a processor such as CPU 601 in some embodiments. The operating system on the computing device may be MS-WINDOWS™, UNIX™, LINUX™, iOS™, CentOS™, Android™, Redhat Linux™, z/OS™, EMC ISILON ONEFS™, DATA ONTAP™ or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA (field programmable gate array) or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of configuring at least one virtual machine by at least one of a plurality of cloud orchestrators, the method comprising:

sending from a server to a client device, availability and pricing information pertaining to a plurality of constraints relating to a plurality of physical resources as managed by a plurality of cloud orchestrators, the plurality of physical resources including storage, network and processing resources, the availability and pricing information being arranged in a plurality of domains including storage, network and compute domains for respective ones of the plurality of constraints relating to the storage, network and processing resources, and indicating an association with respective ones of the plurality of cloud orchestrators according to what each cloud orchestrator supports;

receiving at the server, via the network, selection of individual constraints of the plurality of constraints in domains of the plurality of domains from the client device, the individual constraints including constraints relating to the storage, network and processing resources that are supported by a cloud orchestrator of the plurality of cloud orchestrators;
generating, at the server, a policy for the cloud orchestrator, based on the selection, each of the plurality of cloud orchestrators having a respective specified format for the policy that is specific thereto, and generating the policy includes generating the policy using the respective specified format that is specific to the cloud orchestrator, wherein the policy specifies how to provide the plurality of physical resources for a flexible pricing of using the plurality of physical resources, and wherein generating the policy using the respective specified format includes applying the selection to a template of the respective specified format to generate the policy in the respective specified format; and
allocating, coordinating or provisioning physical resources of the plurality of physical resources to configure at least one virtual machine, by the cloud orchestrator, in accordance with the policy.

2. The method of claim 1, further comprising:
sending from the server to the client device, via the network, a total price based on the selection, wherein the total price is based on atomic constraints, from the plurality of constraints, associated to pricing.

3. The method of claim 1, further comprising:
gathering, at the server, the availability and pricing information from the plurality of cloud orchestrators; and
writing the availability and pricing information to a data structure stored in the server.

4. The method of claim 1, wherein:
the plurality of constraints as related to the storage resources includes storage size, storage type, thin or thick storage provisioning, a plurality of storage tiers, mirroring, or types of redundant array of independent disks (RAID).

5. The method of claim 1, further comprising:
formatting, on the server, the availability and pricing information to be sent to the client device to display in a graphical user interface (GUI), the GUI including a resource field indicating the plurality of physical resources and a constraints field indicating the plurality of constraints.

6. A tangible, non-transitory, computer-readable medium having instructions thereupon which, when executed by a processor, cause the processor to perform a method comprising:
sending from a server to a client device, availability and pricing information pertaining to a plurality of constraints relating to a plurality of physical resources as managed by a plurality of cloud orchestrators, the plurality of physical resources including storage, network and processing resources, the availability and pricing information being arranged in a plurality of domains including storage, network and compute domains for respective ones of the plurality of constraints relating to the storage, network and processing resources, and indicating an association with respective ones of the plurality of cloud orchestrators according to what each cloud orchestrator supports;
receiving at the server, via the network, selection of individual constraints of the plurality of constraints in domains of the plurality of domains from the client device, the individual constraints including constraints relating to the storage, network and processing resources that are supported by a cloud orchestrator of the plurality of cloud orchestrators;
generating, at the server, a policy for the cloud orchestrator, based on the selection, each of the plurality of cloud orchestrators having a respective specified format for the policy that is specific thereto, and generating the policy includes generating the policy using the respective specified format that is specific to the cloud orchestrator, wherein the policy specifies how to provide the plurality of physical resources for a flexible pricing of using the plurality of physical resources, and wherein generating the policy using the respective specified format includes applying the selection to a template of the respective specified format to generate the policy in the respective specified format; and
allocating, coordinating or provisioning physical resources of the plurality of physical resources to configure at least one virtual machine, by the cloud orchestrator, in accordance with the policy.

7. The computer-readable medium of claim 6, wherein the method further comprises:
storing, in a data structure, information relating to pricing and availability of the plurality of physical resources and the plurality of constraints of the plurality of physical resources, the pricing and availability relative to each of the plurality of cloud orchestrators;
identifying constraints of a domain relating to the plurality of physical resources, for each of the plurality of domains including the storage, network and compute domains;
identifying which of the constraints of the domain are supported by which of the plurality of cloud orchestrators, for each of the plurality of domains; and
associating the constraints of the domain to the plurality of cloud orchestrators according to such support, for each of the plurality of domains.

8. The computer-readable medium of claim 6, wherein the policy includes a policy for the network resources, a policy for the storage resources, a policy for the processing resources, or a policy for the at least one virtual machine.

9. The computer-readable medium of claim 6, wherein generating the policy includes generating a plurality of policies including the policy, each of the plurality of policies directed to one or more of the plurality of physical resources and in the respective specified format that is specific to one of the plurality of cloud orchestrators.

10. The computer-readable medium of claim 6, wherein the method further comprises:
communicating to the client device, via the network, a total price of the selection, prior to generating the policy, wherein the total price is based on atomic constraints, from the constraints of the domain for each of the plurality of domains, associated to pricing.

11. The computer-readable medium of claim 6, wherein the plurality of constraints relates to at least one of: security requirements, tenant requirements, compliance, performance, storage tiers, storage mirroring, redundant arrays of independent disks (RAID), network throughput, network priority, virtual machines, or operating systems.

12. The computer-readable medium of claim 6, wherein the method further comprises:
formatting, on the server, the availability and pricing information to be sent to the client device to display in a graphical user interface (GUI), the GUI including a resource field indicating the plurality of physical resources and a constraints field indicating the plurality of constraints.

13. A system for configuring at least one virtual machine by at least one of a plurality of cloud orchestrators, the system comprising:

a server, configured to communicate with a client device via a network, and having a policy generator and a data structure;

the data structure configured to consolidate pricing and availability information regarding a plurality of cloud orchestrators, a plurality of physical resources including physical storage, network and processing resources, and a plurality of constraints for the plurality of physical resources as configurable by the plurality of cloud orchestrators, the pricing and availability information being arranged in a plurality of domains including storage, network and compute domains for respective ones of the plurality of constraints relating to the storage, network and processing resources, and indicating an association with respective ones of the plurality of cloud orchestrators according to what each cloud orchestrator supports;

the policy generator configured to communicate with the client device regarding the pricing and availability information of the plurality of cloud orchestrators, the plurality of physical resources and the plurality of constraints, based on contents of the data structure; and the policy generator configured to receive, from the client device, a selection regarding the plurality of physical resources, individual constraints of the plurality of constraints in domains of the plurality of domains, and a cloud orchestrator of the plurality of cloud orchestrators that supports the individual constraints, the policy generator configured to generate a policy directed to the cloud orchestrator based on the selection, each of the plurality of cloud orchestrators having a respective specified format for the policy that is specific thereto, and the policy generator being configured to generate the policy using the respective specified format that is specific to the cloud orchestrator, wherein the policy specifies how to provide the plurality of physical resources for a flexible pricing of using the plurality of physical resources, and the policy generator being configured to generate the policy using the respective specified format includes being configured to apply the selection to a template of the respective specified format to generate the policy in the respective specified format; and the cloud orchestrator configured to allocate, coordinate or provision physical resources of the plurality of physical resources to configure at least one virtual machine, in accordance with the policy.

14. The system of claim 13, further comprising:

the server having a pricing module, coupled to the data structure and the policy generator, the pricing module configured to coordinate with the policy generator to communicate to the client device a total price based on the selection, wherein the total price is based on atomic constraints, from the plurality of constraints, associated to pricing.

15. The system of claim 13, wherein the policy generator is configured to generate the policy responsive to receiving a direction from the client device to proceed with policy generation based on the selection.

16. The system of claim 13, further comprising:

the server configured to provide, via the network, a portal that presents in a graphical user interface (GUI) a real-time view of costs associated with policy constraints available from a plurality of vendors or providers via the plurality of cloud orchestrators, as communicated by the policy generator regarding the pricing and availability information.

17. The system of claim 13, wherein the server is further configured to format the availability and pricing information to be sent to the client device to display in a graphical user interface (GUI), the GUI including a resource field indicating the plurality of physical resources and a constraints field indicating the plurality of constraints.

\* \* \* \* \*